United States Patent [19]

Fukushima

[11] Patent Number: 5,569,112
[45] Date of Patent: Oct. 29, 1996

[54] TOROIDAL TYPE CONTINUOUSLY VARIABLE TRANSMISSION

[75] Inventor: Hiroshi Fukushima, Ayase, Japan

[73] Assignee: NSK Ltd., Tokyo, Japan

[21] Appl. No.: 492,452

[22] Filed: Jun. 20, 1995

[30] Foreign Application Priority Data

Jun. 23, 1994 [JP] Japan .................................. 6-141680

[51] Int. Cl.$^6$ .................................................. F16H 15/38
[52] U.S. Cl. ............................................ 476/40; 476/42
[58] Field of Search ........................................ 476/40, 42

[56] References Cited

U.S. PATENT DOCUMENTS

| 5,144,850 | 9/1992 | Hibi | 74/200 |
| 5,218,877 | 6/1993 | Fukushima et al. | 476/40 |
| 5,368,529 | 11/1994 | Machida | 476/42 |

FOREIGN PATENT DOCUMENTS 4-69439  3/1992  Japan .

Primary Examiner—Allan D. Herrmann
Attorney, Agent, or Firm—Sughrue, Mion, Zinn, Macpeak & Seas

[57] ABSTRACT

In the toroidal type continuously variable transmission, durability of input-side disc 2 supported by ball spline is improved without reducing power to be transmitted. According to the present invention, spline groove is formed on the inner peripheral surface of a center hole to construct the ball spline. While one end of the spline groove reaches the back surface of the input-side disc, the other end does not reach the inner surface thereof. Since stress occurring in the disc can be mitigated without reducing power to be transmitted, a continuously variable transmission with high performance and excellent durability can be obtained.

7 Claims, 5 Drawing Sheets

5,569,112

TOROIDAL TYPE CONTINUOUSLY VARIABLE TRANSMISSION

BACKGROUND OF THE INVENTION

1. Field of the Invention

The present invention relates to a toroidal type continuously variable transmission which may be used, for example, as a transmission for automobiles.

2. Description of the Related Art

Research has been in progress to employ a toroidal type continuously variable transmission as schematically shown in FIGS. 1 and 2 as a transmission for automobiles. In such the toroidal type continuously variable transmission, an input-side disc 2 is supported concentrically with an input shaft 1 which is rotatably journaled within a transmission casing (not shown), and an output-side disc 4 is secured on an end portion of an output shaft 3 which is rotatably journaled to the same transmission casing. Provided on the inner surface of the transmission casing or on support brackets disposed within the transmission casing for accommodating the toroidal type continuously variable transmission are trunnions 5, 5 for swinging about pivot axes that are skewed in relation to the input shaft 1 as well as to the output shaft 3.

Each of the trunnions 5, 5 is formed from a metal material having a sufficient rigidity and is provided with the pivot axis on the outer side surface of both end portions. Power rollers 7, 7 are rotatably supported, respectively, around displacement axes 6, 6 which are provided at the center portion of the respective trunnions 5, 5. Each of the power rollers 7, 7 is held between the input-side disc 2 and the output-side disc 4.

Formed respectively on the surfaces facing each other as side surface in the axial direction of the input-side disc 2 and the output-side discs 4 are an input-side concave surface 2a and an output-side concave surface 4a each having a section in the form of a circular arc about a point on the pivot axes. Peripheral surfaces 7a, 7a of the power rollers 7, 7 respectively formed into a convex surface resulting from revolution of a circular arc are caused to abut against the input-side concave surface 2a and the output-side concave surface 4a.

A loading cam type pressing device 8 is provided between the input shaft 1 and the input-side disc 2, and the input-side disc 2 is pressed toward the output-side disc 4 by the pressing device 8. The pressing device 8 includes a cam plate 9 rotating together with the input shaft 1 and a plurality (for example four) of rollers 11, 11 retained by a retainer 10. A cam surface 12 consisting of a circumferentially irregular surface is formed on one side surface (right side surface as shown in FIGS. 1 and 2) of the cam plate 9, and a similar cam surface 13 is formed also on the outer side surface (left side surface as shown in FIGS. 1 and 2) of the input-side disc 2. Here, the plurality of rollers 11, 11 are rotatable about axes that are disposed radially from the center of the input shaft 1. It should be noted that the input-side disc 2 is supported so as to be somewhat slidable in the axial direction of and be rotatable in the rotating direction of the input shaft 1.

When the cam plate 9 is rotated with the rotation of the input shaft 1 to result in a rotating phase difference with respect to the input-side disc 2, the plurality of rollers 11, 11 ride on the cam surface 12 and the cam surface 13 to cause the cam plate 9 and the input-side disc 2 to move away from each other. Since the cam plate 9 is supported in a manner incapable of moving in the axial direction on the input shaft 1 which is journaled by means of a bearing to the transmission casing, the input-side disc 2 is pushed toward the power rollers 7, 7 and the power rollers 7, 7 are pushed toward the output-side disc 4. On the other hand, the output-side disc 4 is journaled to the transmission casing so as to be only capable of rotation together with the output shaft 3 and is incapable of axial movement. For this reason, the power rollers 7, 7 are pressed between the input-side disc 2 and the output-side disc 4. A thrust is thus generated between the peripheral surfaces 7a, 7a of the power rollers 7, 7 and the input-side concave 2a and the output-side concave 4a, whereby rotation of the input-side disc 2 is transmitted to the output-side disc 4 through the power rollers 7, 7 substantially without sliding therebetween, rotating the output shaft 3 which is fixed on the output-side disc 4.

In changing the rotating speed ratio between the input shaft 1 and the output shaft 3, if the speed is to be reduced from the input shaft 1 to the output shaft 3, the trunnions 5, 5 are swung about the pivot axes as shown in FIG. 1 so as to cause the displacement axes 6, 6 to be inclined such that the peripheral surfaces 7a, 7a of the respective power rollers 7, 7 abut against the portion toward the center of the input-side concave 2a and against the portion toward the outer periphery of the output-side concave 4a, respectively. To the contrary, if the speed is to be increased, the trunnions 5, 5 are swung as shown in FIG. 2 so as to cause the displacement axes 6, 6 to be inclined such that the peripheral surfaces 7a, 7a of the respective rollers 7, 7 abut against the portion toward the outer periphery of the input-side concave 2a and against the portion toward the center of the output-side concave 4a, respectively. If the inclined angles of the displacement axes 6, 6 are set to some point between those of FIG. 1 and FIG. 2, an intermediate reduction ratio may be obtained between the input shaft 1 and the output shaft 3.

Fundamental construction and operation of a toroidal type continuously variable transmission are as described above. When applying such toroidal type continuously variable transmission to a transmission for an automobile having an engine with a large output, it is contrived that two each of the input-side disc 2 and the output-side disc 4 are provided to secure transmissible power and the sets of input-side discs 2 and the output-side discs 4 are arranged in parallel to each other in the direction of transmitting of power. Shown in FIG. 3 is an example of the toroidal type continuously variable transmission contrived for achieving such object, as disclosed, for example, in specifications of Japanese Patent Application Laid-Open No. 4-69439 and U.S. Pat. No. 5,144,850.

In this conventional construction, an input shaft 15 is supported at the inside of a housing 14 so as to be only rotatable. The input shaft 15 is constituted by a front half portion 15a which is coupled for example to an output shaft of a clutch and a rear half portion 15b which is somewhat rotatable with respect to the front half portion 15a. A pair of input-side discs 2, 2 are supported on both end portions in the axial direction of the rear half portion 15b through ball splines 16, 16 in such a manner as to cause the respective input-side concaves 2a, 2a to face each other. Further, concave portions 20, 20 are formed at the center portion of the back surfaces (surfaces opposite to the input-side concaves 2a, 2a in an axial direction) of the respective input-side discs 2, 2. Disc springs 30, 30 are placed between recessed surfaces of the respective concave portions 20, 20 and a loading nut 28 or a loading plate 29. Pressure toward output-side discs 4, 4 to be described below is imparted to the respective input-side discs 2, 2 by the respective disc springs 30, 30.

A pair of output-side discs 4, 4 are supported around an intermediate portion of the rear half portion 15b rotatably with respect to the input shaft 15 so that the respective output-side concaves 4a, 4a face the respective input-side concaves 2a, 2a in opposite state. Further, a plurality of power rollers 7, 7 rotatably supported on a plurality of trunnions through displacement shafts are held between the respective input-side concave surface 2a and output-side concave surface 4a.

An output shaft 17 is supported at the portion opposite to the front half portion 15a within the housing 14 such that it is concentric with the rear half portion 15b of the input shaft 15 and is rotatable independently from the rear half portion 15b. Here, rotation transmitting means as described below are provided between the output shaft 17 and the pair of the output-side discs 4, 4 so that rotation of the both output-side discs 4, 4 may be freely transmitted to the output shaft 17.

A partition wall 18 is provided within the housing 14 at the portion between the pair of output-side discs 4, 4. A sleeve 21 in the form of a circular tube is supported by a pair of ball-and-roller bearings 27, 27 at the inside portion of a through hole 19 provided on the partition wall 18. The pair of output-side discs 4, 4 are fixed to both end portions of the sleeve 21. A first toothed wheel 22 is rigidly fixed to the middle portion of the sleeve 21 at the inside of the partition wall 18.

On the other hand, a transmission shaft 23 is rotatably supported at the inside of the housing 14 in parallel to the input shaft 15 and the output shaft 17. Here, a second toothed wheel 24 fixed to one end (left end as shown in FIG. 3) of the transmission shaft 23 is directly meshed with the first toothed wheel 22, and a third toothed wheel 25 fixed to the other end of the transmission shaft 23 and a fourth toothed wheel 26 fixed to an end portion of the output shaft 17 are meshed with each other through an idle gear (not shown). By such rotation transmitting means, the output shaft 17 is rotated with the rotation of the pair of the output-side discs 4, 4 to the opposite direction of the output-side discs 4, 4.

Further, a loading cam type pressing device 8 is provided between the front half portion 15a and one (on left side as shown in FIG. 3) of the input-side discs 2 so that, with the rotation of the input shaft 15, the input-side disc 2 may be freely pressed in the axial direction toward the output-side disc 4 which is faced by this input-side disc 2.

In the case of the toroidal type continuously variable transmission constructed as described, the pair of input-side discs 2, 2 are simultaneously rotated with the rotation of the input shaft 15 and such rotation is transmitted simultaneously to the pair of output-side discs 4, 4 and is transmitted to and extracted from the output shaft 17 by the above rotation transmitting means. At this time, since the transmission of rotation is performed through two systems which are in parallel to each other, a large power (torque) is freely transmissible.

In the case of the conventional toroidal type continuously variable transmission which is constructed and operated in the manner as described above, it has not been quite possible to secure a sufficient durability of the input-side discs 2, 2 which are supported on the periphery of the input shaft 15 through the ball splines 16, 16. Specifically, at the time of the transmitting of power through the toroidal type continuously variable transmission, the peripheral surfaces 7a, 7a of the power rollers 7, 7 are tightly pressed against the input-side concave surface 2a and the output-side concave surface 4a by the action of the pressing device 8. In the case of an ordinary toroidal type continuously variable transmission, two power rollers 7, 7 are provided between the pair of input-side disc 2 and output-side disc 4 which sandwich a pair of power rollers 7, 7. For this reason, these two discs 2, 4 receive a large pressing force and are elastically deformed at two locations in their circumference when the power is transmitted.

As a result of such elastic deformation, a large stress is applied also at the portions of the ball splines 16, 16 which are provided for example between inner peripheral surfaces of the input-side discs 2, 2 and an outer peripheral surface of the input shaft 15. Then, the cross section of center holes 31, 31 of the respective input-side discs 2, 2 tend to be elastically deformed into ovals due to the large pressing force which is applied at the two locations as described. As a result of such elastic deformation, durability of the input-side discs 2, 2 supported by the ball splines 16, 16 may be lessened depending on the position of installation of the ball splines 16, 16 with respect to the center holes 31, 31.

For example, when the ball splines 16, 16 are formed up to the inner surface (surface formed with the input-side concave surfaces 2a, 2a) side opening end of the center holes 31, 31, a portion of the balls constituting the ball splines 16, 16 props when the cross section of the center holes 31, 31 is deformed into ovals. As a result, due to the fact that a large load is applied to the contacting points between the ball spline groove and the balls, a large tensile stress occurs in the vicinity of the bottom of the ball spline groove and it is possible that durability of the respective input-side discs 2, 2 may be lessened.

Further, in the conventional construction shown in FIG. 3, concave portions 20, 20 are formed at the back surface center portions of the respective input-side discs 2, 2 and, as a result, the ball splines 16, 16 do not reach the back surfaces of the input-side discs 2, 2. For this reason, when the power is transmitted, the portion toward the outer peripheral of the input-side discs 2, 2 tends to be elastically deformed in the direction moving away from the output-side discs 4, 4 due to the large pressing force at two locations in the circumference as described. As a result, a large tensile stress occurs in the inner surface side opening portion of the center holes 31, 31 and it is also possible that durability of the respective input-side discs 2, 2 may be lessened.

SUMMARY OF THE INVENTION

While reducing of the power to be transmitted is conceivable in order to mitigate occurrence of the stress as described above and to secure the durability of the toroidal type continuously variable transmission, it is not preferable as it leads to a lower performance of the toroidal type continuously variable transmission. The toroidal type continuously variable transmission of the present invention has been made in view of the facts as described above.

A toroidal type continuously variable transmission of the present invention, similarly to the above described conventional toroidal type continuously variable transmission, includes: a pair of disks each with one of axial side surfaces forming a concave having a circular-arc cross section, supported coaxially with each other and rotatable independently from each other in a manner causing the concave surfaces to face each other; trunnions capable of being swung about pivot axes skewed with respect to the rotation center of the two discs; and power rollers with a peripheral surface of a convex resulting from revolution of a circular arc, supported rotatably on displacement axes supported on the trunnions and held between the concave surfaces of the two discs. Here, at least one disc of the pair of discs is supported on the outer peripheral surface of a rotating shaft through a ball spline so as to be displaceable along the axial direction of the rotating shaft.

In particular, in the toroidal type continuously variable transmission of the present invention, a spline groove along the axial direction is formed in a center hole of the one disc in order to constitute the ball spline. Further, one end of the center hole is opened at the back surface of the one disc. Furthermore, one end of the ball spline constituted as including the spline groove is extended substantially to the back surface of the one disc, and the other end of the ball spline exists at the portion of the center hole deeper than the other end opening of the center hole.

In accordance with the toroidal type continuously variable transmission of the present invention constructed as described, stress occurring at the ball spline groove portion of a disc supported on the rotating shaft by a ball spline may be mitigated to improve durability of the disc.

DESCRIPTION OF THE PREFERRED EMBODIMENTS

Figure 1:
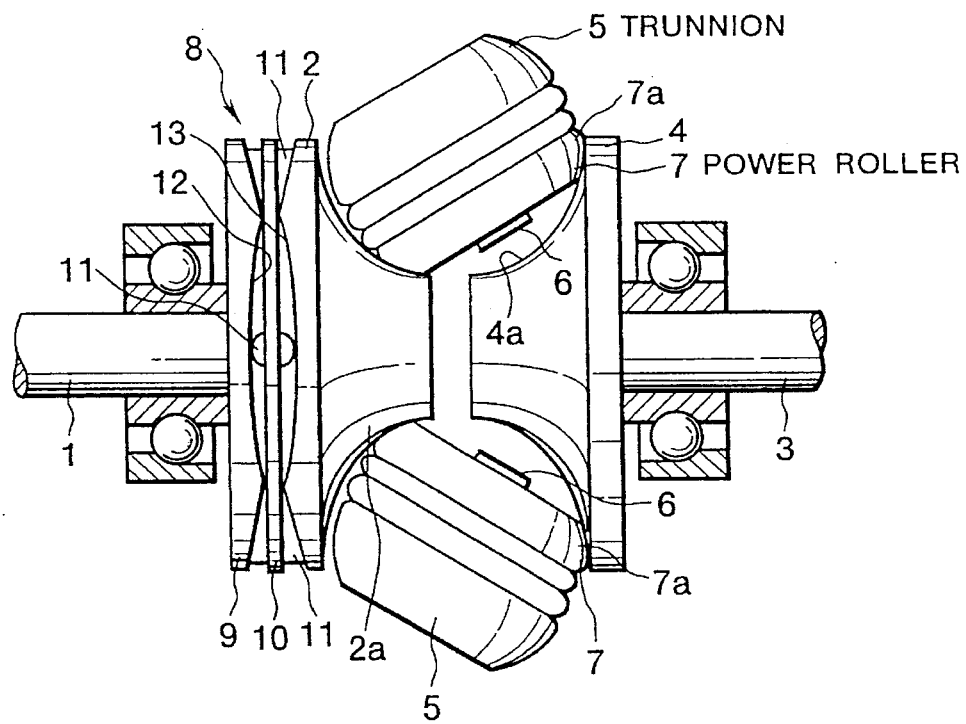
FIG. 1 is a side view of the fundamental construction of a toroidal type continuously variable transmission, showing its state of the maximum speed reduction.
Figure 2:
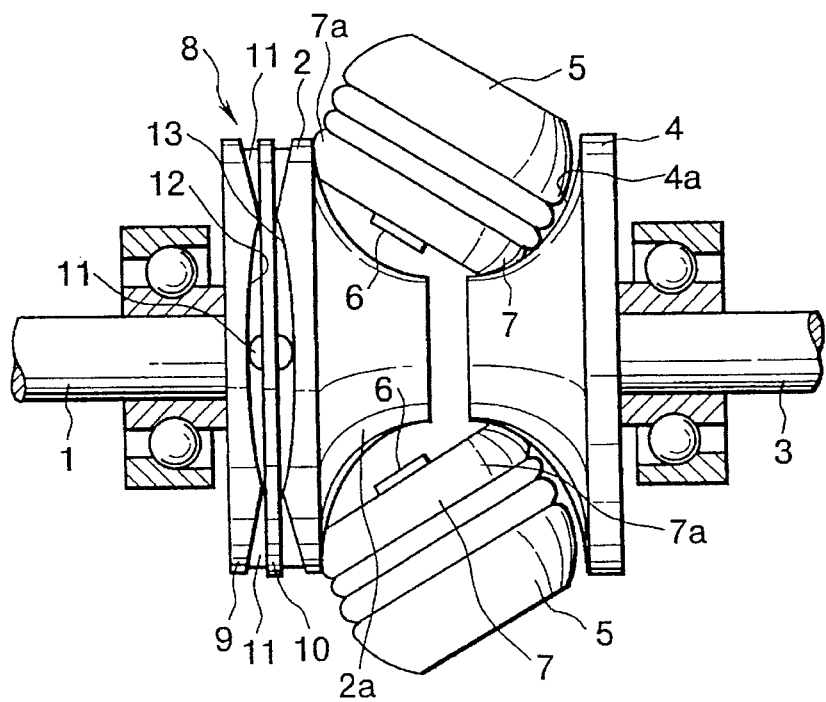
FIG. 2 is a side view showing the state of the maximum acceleration of the same.
Figure 3:
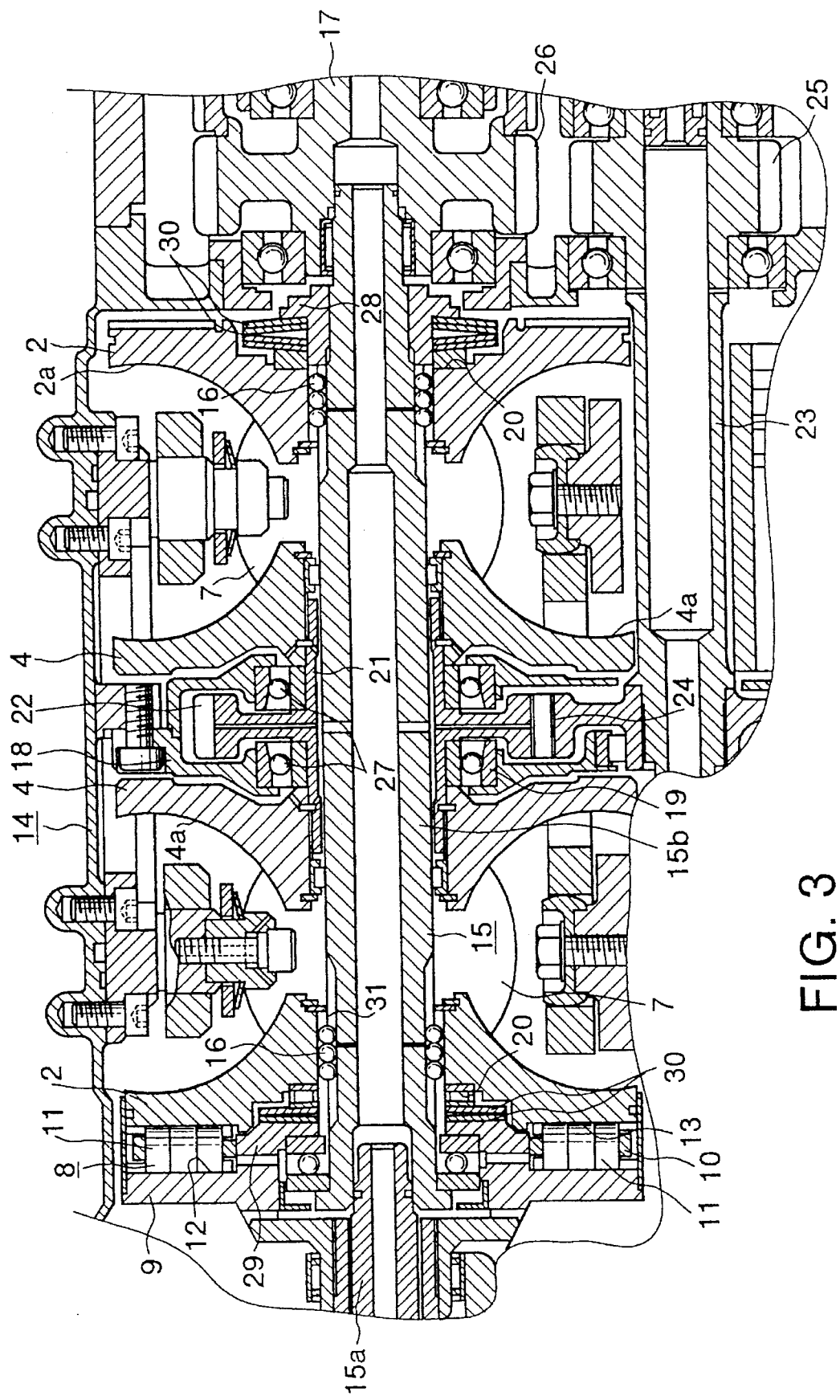
FIG. 3 is a sectional view showing an example of conventionally known toroidal type continuously variable transmission.
Figure 4:
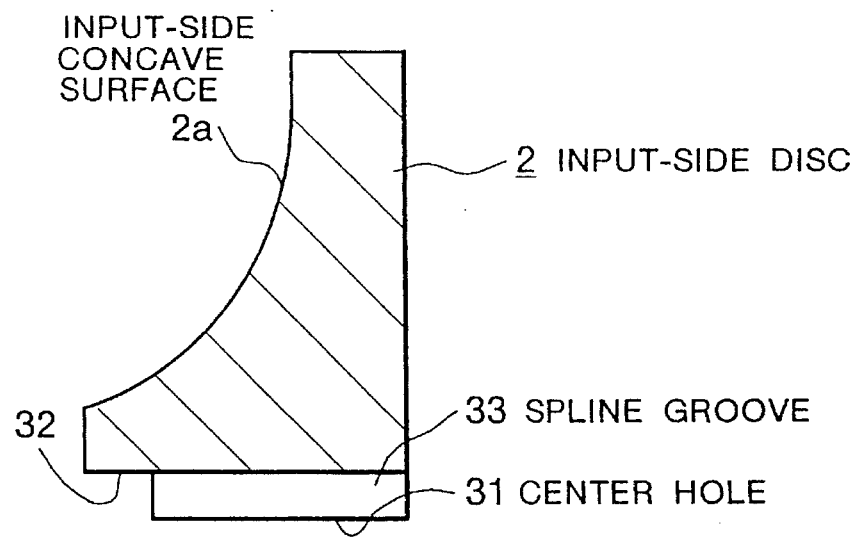
FIG. 4 is a sectional view of a half portion of an input-side disc showing a first embodiment of the present invention.
Figure 5:
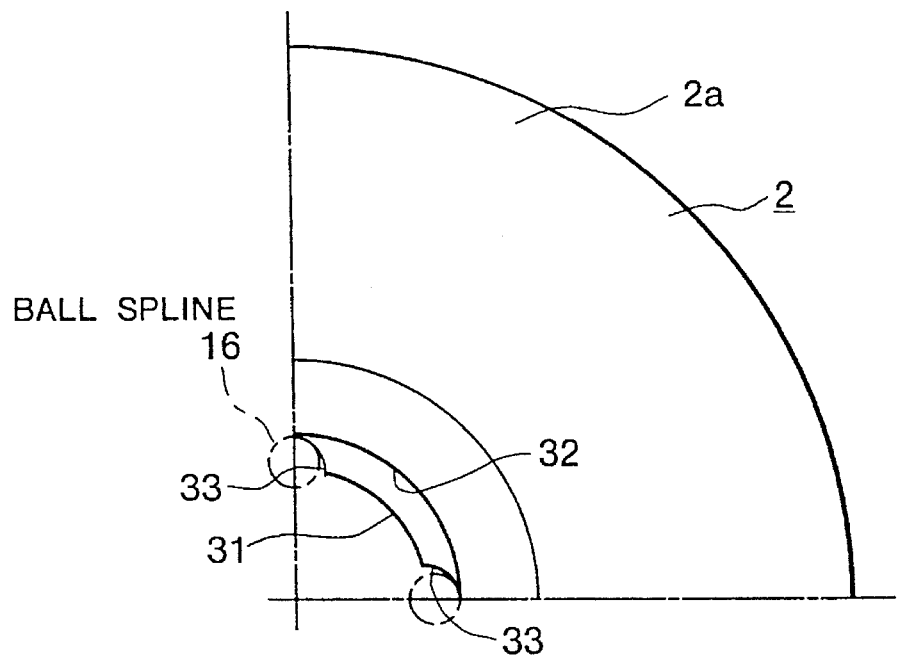
FIG. 5 is a view as seen from the left side of FIG. 4.

FIGS. 4 and 5 show an embodiment of the present invention. A characteristic feature of the present invention resides in the construction of the ball spline portion 16 (FIG. 3) for supporting a disc such as an input-side disc 2 on a rotating shaft such as an input shaft 15 (FIG. 3) so that it is displaceable only in the axial direction. Construction and operation of the other portions are similar to those of the conventional construction as described above. A common description thereof is omitted and a description will be given below with respect to the characteristic feature of the present invention.

A larger diameter portion 32 is formed at an inner surface side opening portion of a center hole 31 of the input-side disc 2. Spline grooves 33, 33 extended in the axial direction for constituting the ball spline 16 are formed on the portion of the inner peripheral surface of the center hole 31 except the larger diameter portion 32. Also, the durability is furthermore improved if the concave portion 20 (FIG. 3) as in the above described conventional construction does not exist at the back surface center portion of the input-side disc 2. One end (right end as shown in FIG. 4) of the center hole 31 is then opened at the back surface of the input-side disc 2. Further, the above described spline grooves 33, 33 reach the end of the center hole 31 and an end of the ball spline 16 constituted as including the spline grooves 33, 33 reaches substantially the back surface of the input-side disc 2. On the other hand, the spline grooves 33, 33 do not exist in the larger diameter portion 32 and, thus, the other end of the ball spline 16 exists at a deeper portion (right side) Of the center hole 31 than is the other end (left end as shown in FIG. 4) opening of the center hole 31.

According to the toroidal type continuously variable transmission of the present invention constructed as described, it is possible to mitigate the stress occurring at the inner peripheral portion of the input-side disc 2 which is supported on the input shaft 15 serving as the rotating axis by means of the ball spline 16, thereby improving the durability of the input-side disc. In particular, since the ball spline 16 does not reach the inner surface side opening end of the center hole 31, cross section at the inner surface side opening end portion of the center hole 31 is less likely to be deformed into an oval whereby application of a large load locally at a contacting point between the ball spline groove and the balls is less probable. Accordingly, a large tensile stress is less likely to occur in the vicinity of the ball spline groove bottom so that the durability of the respective input-side discs 2, 2 may be secured.

Further, the ball spline 16 is extended as far as the back surface of the input-side disc 2. For this reason, even when a large pressing force is applied at two locations in the circumference of the input-side disc 2 due to transmission of the power, the portion toward the outer peripheral of the input-side disc 2 is less likely to be elastically deformed in the direction moving away from the output-side disc 4. As a result, a large tensile stress is less likely to occur at the inner surface side opening portion of the center hole 31, also securing the durability of the input-side disc 2.

Figure 6:
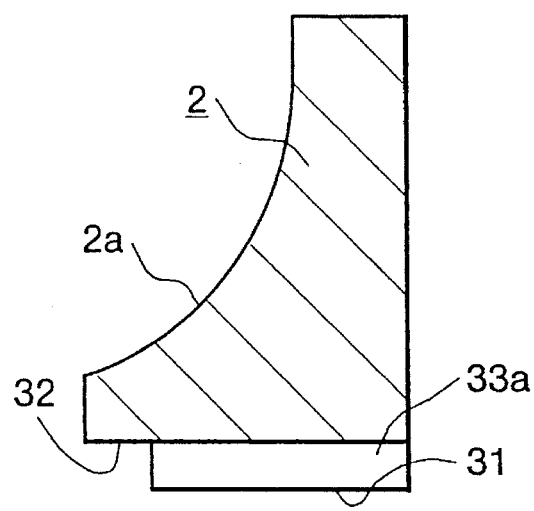
FIG. 6 is a sectional view of a half portion of an input-side disc showing a second embodiment of the present invention.
Figure 7:
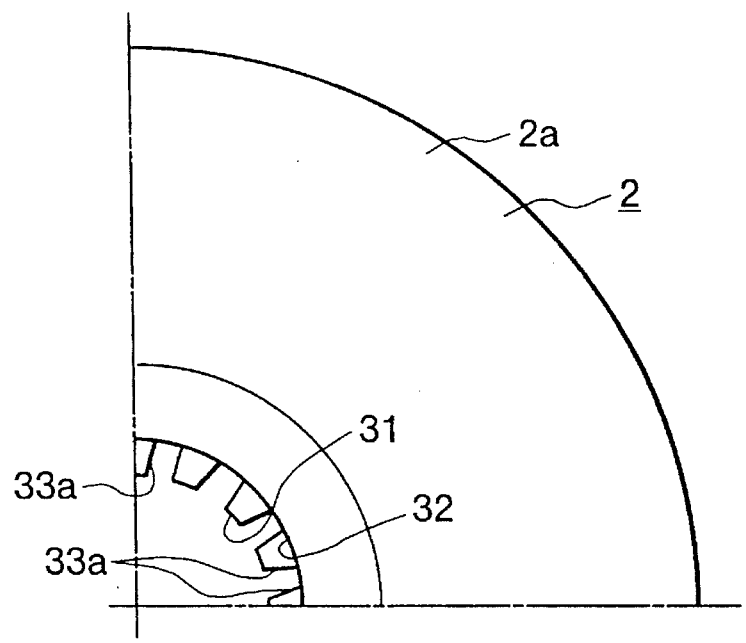
FIG. 7 is a view as seen from the left side of FIG. 6.

Referring now to FIGS. 6 and 7, there is shown a second embodiment of the present invention. In the case of the present embodiment, sectional shapes of the spline grooves 33a, 33a formed on the inner peripheral surface of the center hole 31 of the input-side disc 2 are substantially trapezoid and number of the spline grooves 33a, 33a is increased to constitute a so-called involute spline. Construction and operation of the other portions are similar to the above described first embodiment.

Figure 8:
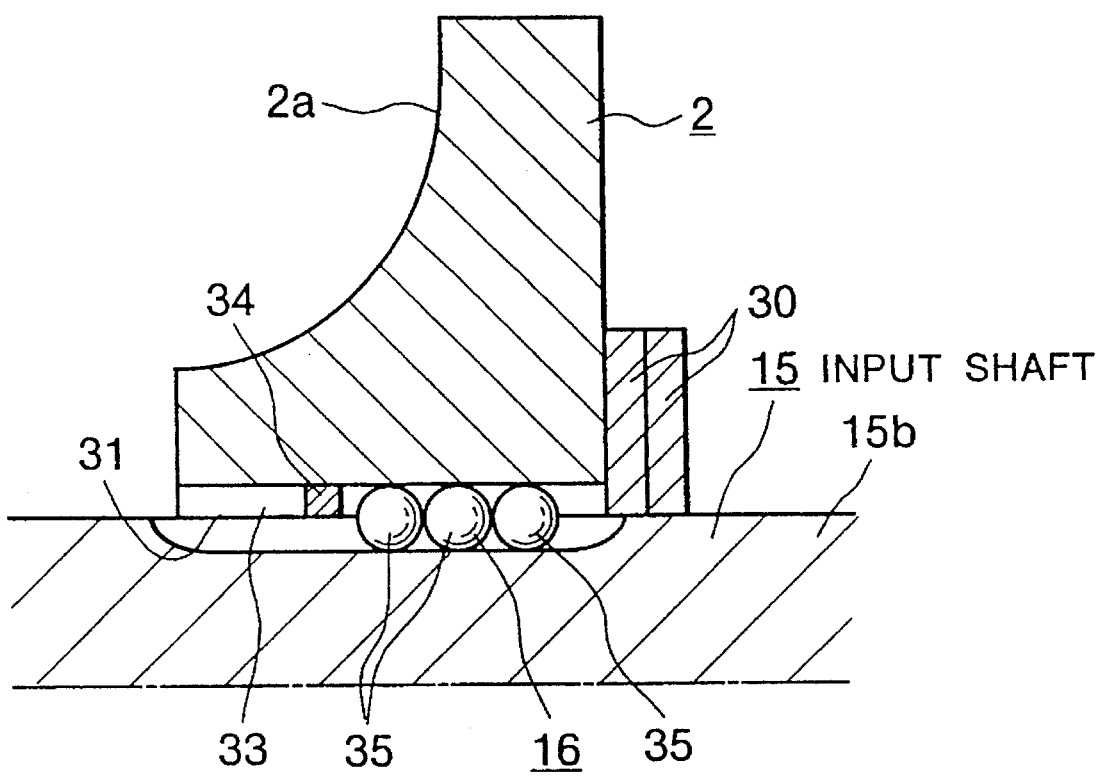
FIG. 8 is a partial sectional view showing a third embodiment of the present invention.

Referring now to FIG. 8, there is shown a third embodiment of the present invention. In the case of the present embodiment, a larger diameter portion 32 (FIGS. 4 to 7) is not formed in the center hole 31 of the input-side disc 2 and the spline groove 33 is formed along the total length of the center hole 31. Instead, a stopper ring 34 is formed on the inner peripheral surface of the center hole 31 so that the balls 35, 35 constituting the ball spline 16 do not reach the inner surface side opening end portion of the spline groove 33. Construction and operation of the other portions are similar to the above described first embodiment.

The toroidal type continuously variable transmission of the present invention is constructed and operated in the manner as described above. Since stress occurring in the disk may be mitigated without reducing power to be transmitted, a toroidal type continuously variable transmission with high performance and excellent durability may be obtained.

What is claimed is:

1. A toroidal type continuously variable transmission comprising a pair of discs of which axial side surfaces form concaves having circular-arc cross section, and which are supported coaxially with each other and are freely rotatable from each other in a manner causing the concave surfaces to face each other; trunnions which are respectively swung about pivot axes skewed with respect to a rotation center of said pair of discs; and power rollers of which peripheral surface are convex on revolution circular-arc surface, and which are supported rotatably and freely on displacement axes supported on said trunnions and held between the concave surfaces of said pair of discs; and at least one disc of said pair of discs being supported on an outer peripheral surface of a rotating shaft through a ball spline so as to be displaceable along an axial direction of the rotating shaft, wherein a spline groove extended in the axial direction for constituting said ball spline is formed on a center hole of said at least one disc, one end of said center hole is opened at a back surface of said at least one disc, one end of said ball spline reaches the back surface of said at least one disc, and the other end of said ball spline is located at a portion of said center hole deeper than the other end opening of said center hole.

2. A toroidal type continuously variable transmission as claimed in claim 1, wherein a larger diameter portion is formed at an inner surface side opening portion of said center hole of said at least one disc and spline grooves extended in the axial direction on a portion of an inner peripheral surface of said center hole except said larger diameter portion.

3. A toroidal type continuously variable transmission as claimed in claim 1, wherein sectional shapes of said spline grooves formed on an inner peripheral surface of said center hole of said at least one disc are substantially trapezoid.

4. A toroidal type continuously variable transmission as claimed in claim 3, wherein number of said spline grooves is increased to constitute a so-called involute spline.

5. A toroidal type continuously variable transmission as claimed in claim 1, wherein a spline groove is formed along a total length of said center hole of said at least one disc.

6. A toroidal type continuously variable transmission as claimed in claim 5, wherein a stopper ring is formed on an inner peripheral surface of a middle portion of said center hole.

7. A toroidal type continulusly variable transmission as claimed in claim 5, wherein balls constituting said ball spline do not reach an inner surface side opening end portion of said spline groove.

* * * * *